Feb. 27, 1968  W. L. BOWEN III  3,370,898

ROLLER RADIAL THRUST BEARING

Filed Oct. 22, 1965

INVENTOR
WILLARD L. BOWEN, III

BY
Mason, Porter, Diller & Brown
ATTORNEYS

# United States Patent Office 3,370,898
Patented Feb. 27, 1968

3,370,898
ROLLER RADIAL THRUST BEARING
Willard L. Bowen III, Harwinton, Conn., assignor to The Torrington Company, Torrington, Conn., a corporation of Maine
Filed Oct. 22, 1965, Ser. No. 501,374
5 Claims. (Cl. 308—179)

ABSTRACT OF THE DISCLOSURE

A bearing is provided, comprising an outer race disposed about a complement of rolling elements, with radially inwardly directed lips disposed adjacent ends of the rolling elements, the lips and outer race comprising a one-piece sheet metal construction, with the race and one of the lips being hardened, and the other lip being unhardened to facilitate bending thereof against the rolling elements. The bearing is generally disposed on a shaft for rotation thereabout, with a shaft abutment in axial engagement with the rolling elements, for transmitting axial thrust through the rolling elements and one of the lips, to a housing which is in axial abutment with a lip.

---

This application relates in general to new and useful improvements in the roller bearing art, and more particularly relates to the assembly of bearings onto shafts in order to permit transmission of radial and axial thrusts through the bearings to a housing.

Accordingly, it is the primary object of this invention to provide a roller bearing capable of transmitting both axial thrusts and radial thrusts.

It is another object of this invention to provide a shell about the rollers of the bearings having bearing races capable of receiving and transmitting both axial and radial thrusts without distortion of the shell.

It is still another object of this invention to provide a bearing journaling a shaft with the bearing being positioned in a housing and the shaft being capable of transmitting an axial thrust through the bearing; the housing being in such relation to the bearing as to be capable of receiving the axial thrust transmitted through the bearing.

With the above and other objects in view that will hereinafter appear, the nature of the invention will be more clearly understood by reference to the following description, the appended claims, and the several views illustrated in the accompanying drawing.

Figure 1:
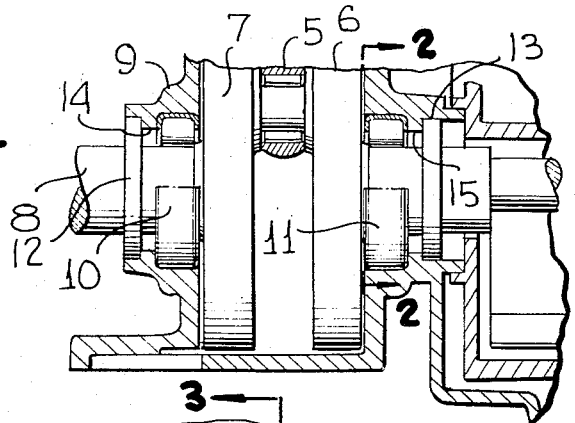
FIGURE 1 is a partial elevational view taken in cross-section through the connecting rod, crankshaft and crankcase assembly of this invention, and illustrates the relationship of the bearing to the shaft, the axial engagement of the shaft and the bearing, and the axial engagement of the bearing and the housing or crankcase.

Referring now to the drawing in detail, reference is first made to FIGURE 1 wherein there is illustrated an adaptation of the bearing of this invention on the crankshaft of an internal combustion engine. The engine includes a connecting rod partially shown at 5, attached in the usual manner through a rotatable connection (unnumbered) to crank cheeks 6 and 7 of a crankshaft 8. The shaft is journaled within a housing 9 by means of roller bearings 10 and 11, disposed about the periphery of the shaft 8. Suitable seals such as 12 and 13 are shown disposed outside the bearings 10, 11 and about the shaft 8.

The connecting rod 5 may be driven by a piston (not shown) which will impart reciprocating motion to the connecting rod 5. The other end of the connecting rod 5 is rotatably attached to the cheeks 6 and 7 of the crankshaft 8, and is offset from the center of the shaft in the usual manner, to impart rotational motion to the shaft 8 during each throw of the connecting rod 5.

The bearing 10, 11 of this invention is not limited to use with an internal combustion engine but will work equally as well, for example, in transmitting axial thrusts from the shaft of a compressor. Whatever the application of the bearing 10, 11 may be, all of the force applied to the shaft will not be utilized to facilitate rotational motion of the shaft, but an axial force will also be applied to the shaft 8, be transferred through the bearings 10 and 11, and be taken up in the housing 9.

Figure 2:
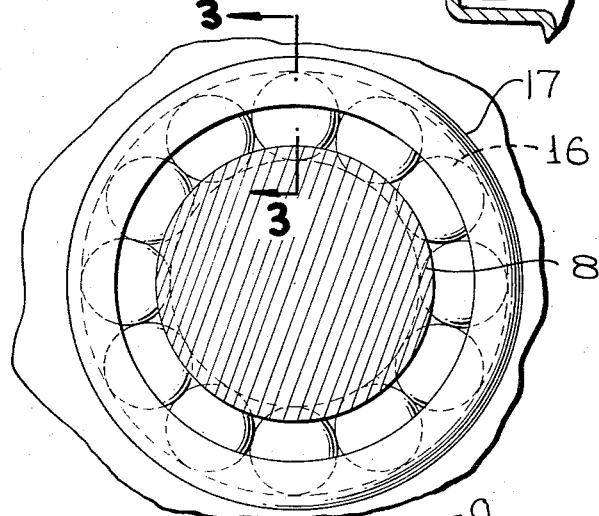
FIGURE 2 is a partial cross-sectional view taken along the line 2—2 of FIGURE 1 and illustrates an enlarged view of the bearing of this invention and the manner in which the bearing journals a shaft.

FIGURE 2 shows in more detail a plurality of rollers 16 mounted about the outer periphery of the shaft 8, for relative motion thereto. The ends 20 of the rollers 16 are partially enclosed by a shell 17, which extends entirely about the outer periphery of the rollers 16 mounted on the shaft 8.

Figure 3:
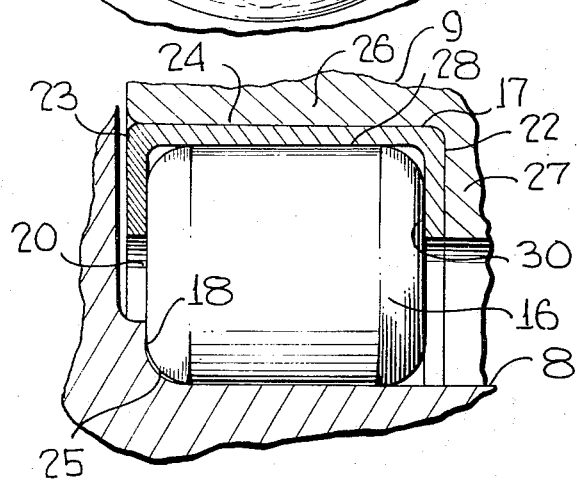
FIGURE 3 is an enlarged partial cross-sectional view taken along the line 3—3 of FIGURE 2.

FIGURE 3 shows in partial cross-section the disposition of a typical cylindrical roller 16 within the shell 17 and adjacent a shoulder 18 of the shaft 8. The shell 17 is disposed within the housing 9. The shoulder 18 of the shaft 8 may form an abutment surface against a portion of the ends 20 of the roller 16, and may be slightly rounded in cross-section to accommodate a rounded corner 25 of the roller 16.

The shell 17 may be formed from sheet metal and has lips 22 and 23 integral with an outer peripheral portion 24 thereof. The lips 22, 23 are bent inwardly of the rollers 16, about the ends 20 of the rollers. The lips 22 and 23 extend only partially across the diameter of each roller 16, on at least one end thereof, in order to enable engagement of the shoulder 18 of the shaft 8 with a corner 25 of the roller. The shell 17 is hardened, as by heat-treating, around the outer peripheral portion 24 thereof, and about the lip portion 22. The other lip 23 would not usually be hardened, in order to facilitate the initial bending of the lip 23 about the rollers 16, in order to retain the rollers against axial movement relative to the shell 17. Housing portions 26 and 27 immediately adjacent the peripheral portion 24 and lip 22 of the shell respectively may also be hardened as by heat-treating in order to enable portions 26 and 27 of the housing 9 to readily withstand the axial thrust exerted thereon, without distortion thereof. The heat-treated or otherwise hardened portions of the shell 17 and housing 9 may be of any desirable hardness, depending upon the materials utilized.

The roller bearings function such that the radial thrust transmitted by the shaft will be carried through the bearing rollers 26, through the hardened peripheral portion 24 of the shell 17, to the hardened portion 26 of the housing 9. Similarly, the axial thrust will be transmitted through the peripheral shoulder 18 of the shaft, through the adjacent corner portion 25 of the rollers 16, across the rollers 16 in a longitudinal direction of the shaft and through the hardened lip 22 of the shell 17, to the hardened portion 27 of the housing 9. Upon rotation of the shaft 8, the rollers 16 rotate relative to the shaft 8 and relative to the hardened races 28 and 30 of the shell 17.

The bearing illustrated is of the full complement type, although this invention is not limited to a full complement bearing. The surface of engagement of the shoulder 18 and the corner 25 of the rollers 16 may be rounded, or fillet-like in cross-section, but may also be of any cross-sectional configuration as would meet the particular application desired, without departing from the scope of this invention. Likewise, the shell may be formed as a stamping, and then bent into the configuration illustrated, or may be formed by any other practical means. Also, while only bearing 11 is illustrated in detail in the drawing, it is to be noted that bearing 10 and other bearing arrangements as may be utilized, may be constructed in the same manner as depicted in detail for the bearing 11.

Although only a preferred embodiment of the invention has been described and illustrated herein, it is to be understood that minor modifications may be made in the bearing and this application within the spirit and scope of the invention, as defined in the appended claims.

I claim:

1. In combination; a shaft subjectable to both radial and axial thrusts, a radial thrust roller bearing, a housing, means for transmission of radial thrust from said shaft through said bearing to said housing; said roller bearing including a plurality of rollers and a sheet metal shell having a race disposed about said rollers and an inwardly bent lip at one end of said rollers, including means for transmission of axial thrust from said shaft through said rollers and shell to said housing; said latter means comprising a portion of said shaft in axial abutment with an end of at least one roller, a portion of said housing being in axial abutment with said inwardly bent lip of said shell, and said inwardly bent shell lip being in axial abutment with an opposite end of each said roller.

2. The combination of claim 1 wherein said shell race is circumferentially disposed about the outer periphery of said rollers; said shell having lips at both ends of said rollers, inwardly disposed in planes substantially transverse to the axis of the shaft; the shell race and that lip which is in abutment with said housing portion each being hardened to form a bearing race capable of transmitting respectively, radial and axial thrust from said shaft to said housing.

3. The combination of claim 2 wherein said portion of a shaft which is in axial abutment with said roller end is a shoulder formed in said shaft which has fillet-like portions in abutment with the rounded corner of said roller.

4. In the combination of a connecting rod subjectable to both radial and axial thrusts, a crankshaft rotatably connected to said rod, a radial thrust roller bearing mounted for rotation relative to said shaft, and a housing disposed about said roller bearing, the improvement comprising an abutment shoulder on said shaft providing a means for transmission of axial thrust from said shaft through said bearing and into said housing, said connecting rod applying both axial thrust and radial thrust to said shaft during at least one throw of said rod, said bearing comprising a plurality of cylindrical rollers arranged circularly for disposition about the shaft, a one-piece sheet metal shell having a peripheral portion disposed about the outer periphery of the circular arrangement of rollers and having lips extending radially inwardly about the ends of said rollers for a distance equal to a portion of the diameter of a roller; the peripheral portion of said shell being hardened to define a race, and means for facilitating the transmission of uni-directional axial thrust through said rollers, said means comprising one of said lips being hardened to define a race and said remaining lip being unhardened to facilitate bending about the ends of the rollers.

5. A radial thrust roller bearing for use in transmitting uni-directional axial thrust comprising a plurality of flat-ended cylindrical rollers arranged circularly for disposition about a shaft, a one-piece sheet metal shell having a peripheral portion disposed about the outer periphery of the circular arrangement of rollers and having lips extending radially inwardly about the ends of said rollers, along the flat ends of the rollers for a distance equal to a portion of the diameter of a roller; the peripheral portion of said shell being hardened to define a race, and means for facilitating the transmission of uni-directional axial thrust through said rollers, said means comprising one of said lips being hardened to define a race and said remaining lip being unhardened to facilitate bending about the end of the rollers.

References Cited

UNITED STATES PATENTS

| 1,790,253 | 1/1931 | Taylor | 308—216 |
| 1,917,452 | 7/1933 | Lott | 308—212 |
| 2,038,474 | 4/1936 | Brown | 308—216 |
| 2,711,352 | 6/1955 | Hasko et al. | 308—72 |
| 3,038,766 | 6/1962 | Altson | 308—180 |

FOREIGN PATENTS

| 126,927 | 5/1919 | Great Britain. |

MARTIN P. SCHWADRON, *Primary Examiner.*

FRANK SUSKO, *Examiner.*